(12) United States Patent
Lowe

(10) Patent No.: US 10,646,772 B1
(45) Date of Patent: May 12, 2020

(54) WATER BALLOON WITH ERADICABLE COLORANT

(71) Applicant: Taylor Christopher Lowe, Brea, CA (US)

(72) Inventor: Taylor Christopher Lowe, Brea, CA (US)

( * ) Notice: Subject to any disclaimer, the term of this patent is extended or adjusted under 35 U.S.C. 154(b) by 0 days.

(21) Appl. No.: 16/413,264

(22) Filed: May 15, 2019

(51) Int. Cl.
| | |
|---|---|
| A63H 33/22 | (2006.01) |
| A63H 27/10 | (2006.01) |
| A63F 9/02 | (2006.01) |
| C09B 21/00 | (2006.01) |

(52) U.S. Cl.
CPC .......... *A63F 9/0278* (2013.01); *A63H 27/10* (2013.01); *A63H 33/22* (2013.01); *C09B 21/00* (2013.01); *A63F 2250/0407* (2013.01)

(58) Field of Classification Search
CPC ........ A63H 23/00; A63H 33/22; A63H 27/10; F42B 8/26; F42B 12/40; F42B 12/46; F42B 27/00
See application file for complete search history.

(56) References Cited

U.S. PATENT DOCUMENTS

| | | | | |
|---|---|---|---|---|
| 5,258,279 A | * | 11/1993 | Simon | B41M 5/136 430/203 |
| 5,356,327 A | * | 10/1994 | Gill, III | A63H 27/10 249/60 |
| 5,532,029 A | | 7/1996 | Fuerst et al. | |
| 5,842,905 A | * | 12/1998 | Lee | A63H 3/44 446/296 |
| 6,007,797 A | | 12/1999 | Bell et al. | |
| 6,083,128 A | * | 7/2000 | Young | A63B 43/02 124/5 |
| 2003/0139234 A1 | * | 7/2003 | Iggulden | A63B 39/06 473/606 |
| 2004/0232170 A1 | * | 11/2004 | Glick | A61M 21/02 222/383.1 |
| 2006/0156943 A1 | * | 7/2006 | Tippmann | F42B 8/26 102/498 |
| 2012/0148741 A1 | | 6/2012 | Silva | |

OTHER PUBLICATIONS

Does the Product Work, Mar. 6, 2016, <https://www.does-the-product-work.com/battle-balloons-color-combat/> (Year: 2016).*

* cited by examiner

*Primary Examiner* — Eugene L Kim
*Assistant Examiner* — Alyssa M Hylinski
(74) *Attorney, Agent, or Firm* — Lodestone Legal Group; Jeromye V. Sartain

(57) ABSTRACT

Apparatus, systems, and methods for delivery of an automatically clearing composition in a balloon.

18 Claims, 1 Drawing Sheet

WATER BALLOON WITH ERADICABLE COLORANT

FIELD OF THE INVENTION

The field of the invention is water balloons.

BACKGROUND

The following description includes information that may be useful in understanding the present invention. It is not an admission that any of the information provided herein is prior art or relevant to the presently claimed invention, or that any publication specifically or implicitly referenced is prior art.

A water balloon fight is a classic American pastime. Individuals fill balloons with water, and throw the water balloons at one another. However, individuals are generally limited to only having water in the balloons, since other substances that would more readily indicate a "hit," such as paints and dyes, can be hazardous, and can be difficult to remove on persons and from clothing. A more recent phenomenon is paint ball, involving smaller, generally spherical water-based dye-filled gelatin or other such capsules or balloons, typically fired from a paint ball gun.

U.S. Pat. No. 5,532,029 (Fuerst et al.) teaches sunscreen and paint balls having visual indicators that are visible at a first pH, and invisible at a second pH. The visual indicators are contained within the sunscreen/paint ball in a liquid format. However, such balls are heavy, difficult to ship, may have chemical instability, and are prone to leakage. Also, Fuerst uses pH changes to affect a color shift. However, pH sensitive dyes often require strongly acidic or basic solutions, which can be irritating to skin and eyes, to change color.

U.S. Pat. App. Pub. 2012/0148741 (Silva) teaches a foaming composition for generating temporary indications. The foaming composition helps referees create temporary lines, and after a short time, the foaming composition disappears. However, there are several disadvantages of the Silva foam. Among other things, the foam would need to be generated at the site, and a balloon filled with such foam would have insufficient weight to be effectively used in a water balloon fight. In addition, some sort of mechanism would be necessary to either form such a foam inside a balloon or direct a foam into a balloon.

U.S. Pat. No. 6,007,797 (Bell et al.) teaches a disappearing color sunscreen composition. The concentration of dye in the sunscreen is low, so that the color is no longer visible after the sunscreen is spread on skin. The sunscreen also contains water-insoluble, film-forming polymers to prevent the sunscreen from being rubbed off by physical contact with clothing, towels, and furniture. Such compositions would also be impractical in water balloons because they are water-insoluble.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the terms "about" or "approximately." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for compositions and methods that provide a colorant that is suitable for use with a water balloon.

SUMMARY OF THE INVENTION

The inventive subject matter provides apparatus, systems, and methods for delivery of an automatically clearing composition in a balloon. As used herein, the term "automatically clearing composition" means a composition that appears colored to the naked eye when initially applied in a wet form, but that after a period of time automatically turns clear upon drying, oxidizing, or otherwise. As used herein, the term "balloon" means any flexible bag or container of any size or kind that can be filled or inflated with a fluid, whether liquid or gas or any combination thereof, and whether or not pre-filled. As used herein, the term "colored" means a composition having an optical density of greater than 0.5. As used herein, the term "clear" means a composition having an optical density of less than 0.1 (i.e., translucent or transparent). As used herein, the term "vesicle" means a cavity or sac that contains something. All ranges described herein should be interpreted as being inclusive of the stated endpoints.

Preferred embodiments include a colorant that changes from visible to clear at different redox states, and more preferably following contact with a redox potentiating agent, whether oxidizer or reducer. The redox potentiating agent can be supplied, or found in nature (e.g., air or sunshine as an oxidizing agent).

In one embodiment, the colorant has a first redox state characterized by having significant absorbance within the visible spectrum, and a second redox state characterized by having insignificant absorbance within the visible spectrum. Preferred systems also include a redox potentiating agent. Either the colorant or the redox potentiating agent is instilled within a frangible enclosure, such that release of the instilled composition from the enclosure results in oxidation or reduction of the colorant. Where the redox potentiating agent is an oxidizer, a preferred agent is sodium perborate. Where the redox potentiating agent is a reducing agent, a preferred agent is ascorbic acid.

In a preferred system, the dye has an optical density of greater than 0.5 when in a first redox state, and the dye has an optical density of less than 0.1 when in a second redox state. The balloon has an opening, a first surface (inside of the balloon), and a second surface (outside of the balloon). The first surface has a coating of the redox potentiating agent and/or the colorant.

Contemplated balloons can include a crosshatch pattern or other indicia of fill volume. Contemplated balloons can also be made from natural and/or synthetic materials, including for example polyurethane, rubber, and latex. When filled to an appropriate level with water, and conformed approximately to a spherical shape, preferred balloons have a diameter from one inch (1 in) to five inches (5 in), though may be smaller or larger depending on a number of factors. By way of illustration and not limitation, where the balloons are to be configured for use in paint ball they may be formed as spherical capsules on the order of one-quarter inch (0.25 in) to three-quarter inch (0.75 in) in diameter, though again may be smaller or larger. Any such balloons for any purpose may be pre-filled, including the water and any related materials of the composition or system, or may be filled as by adding water to the balloon or system by an end-user in any manner now known or later developed.

In other aspects, the colorant/redox potentiating agent combination can have applications outside of water balloons, for example, drawing tools, color runs, religious festivals, etc.

Various objects, features, aspects, and advantages of the inventive subject matter will become more apparent from the following detailed description of preferred embodiments, along with the accompanying drawing figures in which like numerals represent like components, which illustrate, by way of example, the principles of aspects of the invention.

BRIEF DESCRIPTION OF THE DRAWINGS

The accompanying drawings illustrate aspects of the present invention. In such drawings.

Figure 1:
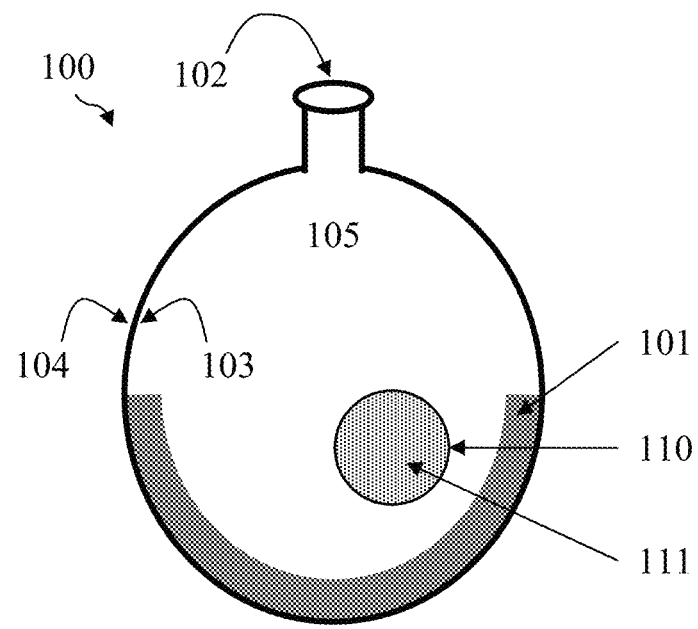
FIG. 1 is a cross-sectional view of a water balloon, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION OF THE INVENTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

FIG. 1 shows a system 100 for delivery of an automatically clearing composition, which generally includes a balloon 105, a colorant 101, a redox potentiating agent 111, at least one vesicle 110, and optionally a buffering compound.

The redox potentiating agent 111 includes a pharmaceutically acceptable compound.

The colorant 101 has a first redox state and a second redox state. In the first redox state, the colorant is characterized by having significant (having an optical density greater than 0.5) absorbance within the visible spectrum. In the second redox state, the colorant is characterized by having insignificant (having an optical density less than 0.1) absorbance within the visible spectrum. At least one of the colorant and redox potentiating agent are disposed within at least one vesicle. The most preferred colorant is methylene blue, but other contemplated colorants include: woad; indigo; saffron; madder; paramagnetic iron oxide; siccative oil; linseed oil; 2,2' bipyridine (Ru or Fe complex); nitrophenanthroline (Fe complex); N-phenylanthranilic acid; 1,10-phenanthroline iron sulfate complex; N-ethoxychrysoidine; 2,2' bipyridine; 5,6 dimethylphenanthroline; o-Diansidine; sodium diphenylamine sulfonate; diphenylbenzidine; diphenylamine; viologen; sodium 2,6-dibromophenol-indophenol; sodium o-cresol indophenols; thionine; indigotetrasulfonic acid; indigotrisulfonic acid; indigo carmine; indigomono sulfonic acid; phenosafranin; safranin; and neutral red. In general, the colorant can include any suitable dye, pigment, ink, paint, chemical, or other substances that, when added to something else, cause a change in color. The form of the colorant can include, but is not limited to, powders, film, pellets, tablets, and capsules. It should be appreciated that one can calculate the amount of colorant that must be added to the balloon using the maximum volume of the balloon, the colorant's extinction coefficient, and the colorant's molar mass. A path length of one centimeter can be used for the purposes of calculating the mass of dye to achieve an optical density greater than 0.5.

Example

When methylene blue is used as the colorant, a blue solution forms upon adding water. In this embodiment, a reducing agent, such as dextran, is used as the redox potentiating agent. Upon release from the vesicle(s), the methylene blue and reducing agent react to give a colorless solution according to the equation below.

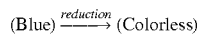

$$(\text{Blue}) \xrightarrow{reduction} (\text{Colorless})$$

Methylene blue has a molar mass of 319.85 g/mole and an extinction coefficient of about 95,000 dm$^{-3}$ cm$^{-1}$ at 664 nm. Assuming an approximately 1 L water balloon (approximately 5 inch diameter), if optical density is measured using a 1 cm path length, then solutions containing 1.6 mg of methylene blue will give an optical density of 0.5 at 664 nm. Thus, 1.6 mg or more methylene blue must be loaded into each balloon. For example, 1.6, 1.8, 2, or 5 mg of methylene blue can be loaded into the balloon. Optionally, the methylene blue can be incorporated in a coating on the interior surface of the balloon. Alternatively, the methylene blue may be loaded into vesicles. It should be appreciated that if methylene blue is not loaded into vesicles, the redox potentiating agent can be loaded into the vesicles to prevent mixing before the water balloon bursts.

In an embodiment, the redox potentiating agent is an oxidizing agent. For example, the oxidizing agent is sodium perborate, which is a water-soluble compound. Some oxidation-based dyes, including hydrogen peroxide, are not stable on drying. Preferred oxidizing agents, including sodium perborate, are stable when dry and provide oxidizing conditions when placed in solution. The form of the oxidizing agent can include, but is not limited to, powders, films, pellets, tablets, and capsules. Some pharmaceutically acceptable compounds include hydrogen peroxide, sodium percarbonate, and sodium perborate.

In another embodiment, the redox potentiating agent is a reducing agent. For example, the reducing agent can be ascorbic acid, which is one form of vitamin C. Ascorbic acid is easily oxidized. The form of the reducing agent can include, but is not limited to, powders, film, pellets, tablets, and capsules.

The vesicle 110 can be made of any suitable natural or artificial component, including, gelatin, chitosan, calcium alginate, polymers (e.g., poly(2-hydroxyethyl methacrylate), pluronic gels), porous styrene, dextran, silicate materials (e.g., nesosilicates, orthosilicates, sorosilicates, cyclosilicates, inosilicates, phyllosilicates, tectosilicates), talc, silica beads, sol-gels, cosmetic microbeads (e.g., polyethylene microspheres), liposomes, lipid bilayers, lipid multilayers, and core-shell. Upon exposure to an element, the colorant or redox potentiating agent disposed within the vesicle is released. The vesicle 110 can release the colorant and redox potentiating agent by cracking, breaking, exploding, melting, oxidizing, or any combination or other form of releasing. The element can include, but is not limited to, water, air, light, heat, or any other type of natural or artificial component. A balloon may include many thousands of tiny vesicles 110.

For safety purposes, the optional buffering compound is preferably selected to maintain an approximately neutral pH (between pH 6 and pH 8) when the colorant and redox potentiating agent are together in aqueous solution. Having a neutral pH helps ensure that an individual's eye is not irritated. Suitable buffers may include phosphate salts, bicarbonate salts, Tris, members of the Good's buffer series, Tricine, TAPS, Bicine, TAPSO, HEPES, TES, MOPS, PIPES, Cacodylate, SSC, MES, ADA, aces, Bis-Tris; BES, DIPSO, and MOBS. When reconstituted at recommended volumes, buffer concentrations can range from 10 mM to 250 mM. (See e.g., http://www.sigmaaldrich.com/life-science/core-bioreagents/biological-buffers/learning-center/buffer-reference-center.html).

To affect a useful color reduction, the colorant in the first redox state should have significant absorbance (i.e., optical density of greater than 0.5) within the visible spectrum. For example, colorants in the first redox state of a filled water balloon could have optical densities of at least 0.7, at least 1.0, or at least 2.0. An optical density of 1.0 is considered a dark color, and an optical density of 2.0 is considered a very dark color.

To affect useful clearing of the color, the second redox state of the colorant should have insignificant absorbance (optical density of less than 0.1) within the visible spectrum.

Balloon 105 has an opening 102, a first surface 103 comprising the inside of the balloon, and a second surface 104 comprising the outside of the balloon. Most likely the colorant and the redox potentiating agent will be dropped into the cavity of the balloon, either in free form or contained in vesicles.

Balloons can be made from any suitable natural or synthetic material(s). Materials can include, rubber, latex, polychloroprene, nylon, plastic, or any other combination of materials. The materials may be one color, multiple colors, transparent, translucent, or any other combination of colors.

Balloons are preferably rounded or oval when filled with water, to facilitate water balloon or paint ball fights or other such recreation. Suitable sizes for rounded balloons range from approximately one-quarter inch (0.25 in) in diameter to five inches (5 in) in diameter, though again other size and shapes are possible without departing from the spirit and scope of the invention.

Figure 2:
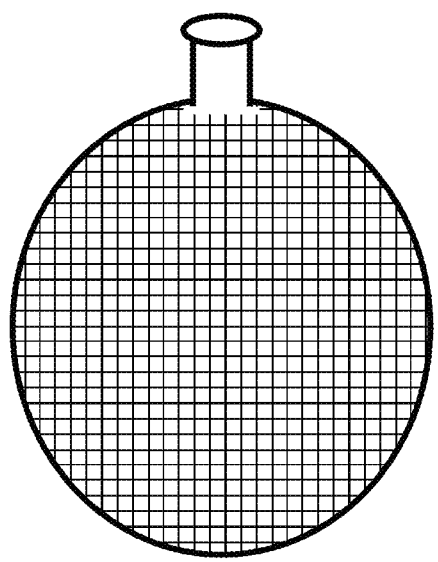
FIG. 2 is an exterior view of a water balloon showing the crosshatch pattern of volume indicia, in accordance with at least one embodiment.

FIG. 2 shows an indicium of fill volume indicia being that of a crosshatch pattern. Indicia of fill volume may also include other types of markings, for example, a fill line, multiple fill lines, and other markings to inform an individual of when to stop filling the balloon with liquid. The indicia may be located anywhere on the balloon, including, the inside and outside. The indicia of fill volume can be incorporated into the material of the balloon, and also printed on the surface of the balloon.

In closing, regarding the exemplary embodiments of the present invention as shown and described herein, it will be appreciated that water balloon systems, apparatus, and methods are disclosed and configured for providing a colorant that is suitable for use with a water balloon. Because the principles of the invention may be practiced in a number of configurations beyond those shown and described, it is to be understood that the invention is not in any way limited by the exemplary embodiments, but is able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A system for delivery of an automatically clearing fluid composition, comprising:
    a balloon that contains a colorant and a redox potentiating agent, the colorant having a first redox state in which the colorant is colored, and a second redox state in which the colorant is clear, and the redox potentiating agent comprising a compound effective to change the colorant from the first redox state to the second redox state; and
    at least one of the colorant and the redox potentiating agent disposed within at least one vesicle, the colorant and the redox potentiating agent and thus the at least one vesicle all being contained within the balloon, whereby only upon bursting the balloon and the at least one vesicle as by the balloon striking a target are the colorant and the redox potentiating agent released so that the colorant in the first redox state marks the target and interacts with the redox potentiating agent to subsequently change from the first redox state to the second redox state.

2. The system of claim 1, wherein the redox potentiating agent is an oxidizing agent.

3. The system of claim 2, wherein the oxidizing agent is sodium perborate.

4. The system of claim 1, wherein the redox potentiating agent is a reducing agent.

5. The system of claim 4, wherein the reducing agent is ascorbic acid.

6. The system of claim 1, further comprising a buffering compound.

7. The system of claim 1, wherein the colorant has an optical density of greater than 0.5 when in the first redox state.

8. The system of claim 1, wherein the colorant has an optical density of less than 0.1 when in the second redox state.

9. The system of claim 1, wherein the colorant is methylene blue.

10. The system of claim 1 wherein at least one of the colorant and the redox potentiating agent is disposed as a coating on an inside surface of the balloon.

11. The system of claim 1, wherein the balloon has an indicium of fill volume.

12. The system of claim 1, wherein the balloon has a wall thickness between 0.1 to 10 microns, inclusive.

13. The system of claim 1, wherein the balloon has a maximum fill volume of no more than 0.8 liters.

14. The system of claim 1, wherein the vesicle comprises at least one of a polymer and a silicate material.

15. A system for delivery of an automatically clearing fluid composition, comprising:
    a balloon that contains a colorant and a redox potentiating agent, the colorant having a first redox state in which the colorant has an optical density of greater than 0.5, and a second redox state in which the colorant has an optical density of less than 0.1, and the redox potentiating agent comprising a compound effective to change the colorant from the first redox state to the second redox state, the redox potentiating agent selected from the group consisting of an oxidizing agent and a reducing agent; and
    at least one of the colorant and the redox potentiating agent disposed as a coating on an inside surface of the balloon, whereby only upon bursting the balloon as by the balloon striking a target do the colorant and the redox potentiating agent interact to change from the first redox state to the second redox state.

16. A system for delivery of an automatically clearing fluid composition, comprising:
    a balloon that contains a colorant and a redox potentiating agent, the colorant having a first redox state in which the colorant has an optical density of greater than 0.5, and a second redox state in which the colorant has an optical density of less than 0.1, and the redox potentiating agent comprising a compound effective to change the colorant from the first redox state to the second redox state;
    at least one of the colorant and the redox potentiating agent disposed within at least one vesicle; and at least one of the colorant and the redox potentiating agent disposed as a coating on an inside surface of the balloon, the colorant and the redox potentiating agent and thus the at least one vesicle all being contained within the balloon, whereby only upon bursting the balloon and the at least one vesicle are the colorant and the redox potentiating agent released so as to interact and change the colorant from the first redox state to the second redox state.

17. The system of claim 1, wherein the colorant is in the first redox state upon addition of water to the balloon so as to form the fluid, whereby only upon filling the balloon with water is the colorant activated.

18. The system of claim 17, wherein the colorant is in a form selected from the group consisting of coating, powders, film, pellets, tablets, and capsules.

* * * * *